April 23, 1940.  O. S. PETERS  2,198,041

EXTENSOMETER

Filed Oct. 28, 1937

INVENTOR
ORVILLE S. PETERS
BY
*Edward C. Hathaway*
ATTORNEY

Patented Apr. 23, 1940

2,198,041

UNITED STATES PATENT OFFICE 2,198,041

EXTENSOMETER

Orville S. Peters, Chevy Chase, Md., assignor, by mesne assignments, to The Baldwin Locomotive Works, a corporation of Pennsylvania Application October 28, 1937, Serial No. 171,522

13 Claims. (Cl. 33—147)

This invention relates generally to extensometers and more particularly to an extensometer adapted for use with strain recording apparatus.

In measuring and recording the elongations of a specimen stressed, for instance, in a materials testing machine, it is highly desirable that the extensometer which is attached to the specimen should be of minimum weight to avoid introduction of error and also the extensometer heads should be adapted to move axially relatively to each other with maximum freedom upon occurrence of specimen strain, but at the same time the heads must be maintained in structural cooperation to provide an adequate support for a strain responsive means attached to the heads whereby a follow-up element of this means may be operated from an external source of power without influencing the delicate and precision qualities which are desired to be obtained. This means is herein specifically shown as an electrical contact leverage system for controlling a remotely located recorder or indicator although in accordance with the principles of my extensometer other types of strain responsive means could be used. In addition, it is necessary to maintain the heads in parallelism while at the same time permitting averaging of any irregularities in strain. The specific type of recording extensometer hereof involves the additional difficulty that the electrical contacts are in combination with a micrometer screw, thereby necessitating an instrument of sufficient strength and rigidity to insure a perfect operative relation between the contacts at all times.

It is an object of my invention to provide an improved recording extensometer that will have all of the foregoing desirable qualities.

A further object is to provide an improved recording extensometer employing electrical contacts one of which is responsive to strain and the other of which is adjusted by a follow-up micrometer screw, all carried by the extensometer frame which is so constructed and arranged as to be of extraordinary light weight but still providing a sufficiently firm operative means to maintain the contacts in precise cooperative relation.

Other objects and advantages will be more apparent to those skilled in the art from the following description of the accompanying drawing in which.

Figure 1:
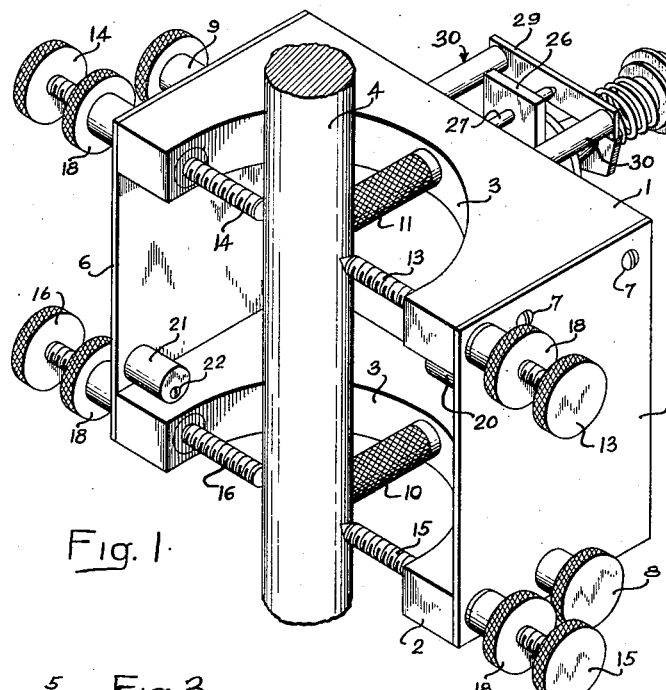
Fig. 1 is a perspective of my improved extensometer applied to a specimen.

In the particular embodiment of the invention, such as is disclosed herein merely for the purpose of illustrating one specific form among possible others that the invention might take in practice, I have provided upper and lower clamping heads 1 and 2 having enlarged semi-circular recesses 3 to receive specimens 4 of various diameters. The clamping heads 1 and 2 are connected by relatively thin side plates 5 and 6, the upper end of plate 5 being permanently rigidly secured to head 1 as by screws 7 while the lower end of said plate is releasably attached to but maintained in guided relation to lower head 2 by a clamping screw 8. The opposed side plate 6 is reversely connected to the heads 1 and 2 in that the lower end of plate 6 is permanently rigidly secured to lower head 2 while the upper end of plate 6 is releasably secured to but maintained in guided relation to upper head 1 through a clamping screw 9, Fig. 4. Clamping screws 8 and 9 are identical in construction and in their relation to their respective side plates and heads, and hence the disclosure of screw 9 and its plate 6 will suffice for both. To center the specimen 4, a pair of pins 10 and 11 are removably secured, preferably by threads, in one end of horizontal recesses in the upper and lower heads. Different lengths of pins may be employed for different diameter specimens.

Figure 4:
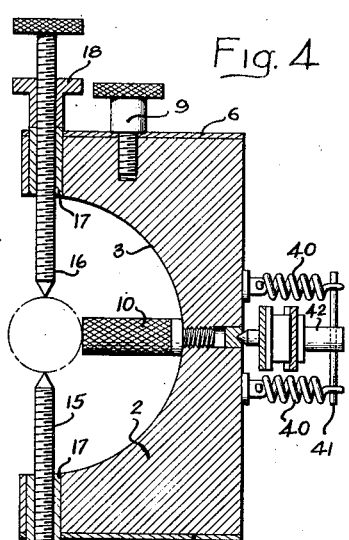
Fig. 4 is a horizontal section taken substantially on the line 4—4 of Fig. 3.

The upper head has a pair of opposed gauge points 13, 14 and the lower head has a similar pair 15, 16. Each of the gauge points is identical and as shown in Fig. 4 has threaded engagement with their respective heads, preferably through a sleeve insert 17. Lock nuts 18 secure the gauge points in position after the extensometer is attached to a specimen.

Figure 6:
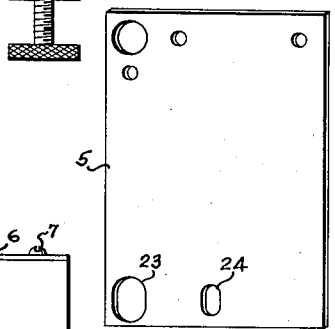
Fig. 6 is a perspective view of one of the side plates of the frame structure.
Figures 2, 5:
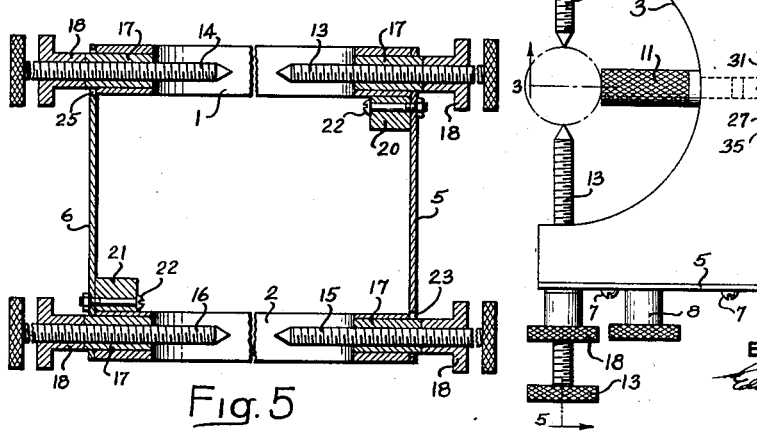
Fig. 2 is a plan view of the extensometer.
Fig. 5 is a vertical section taken substantially on the line 5—5 of Figs. 2 and 3.

To determine the precise gauge length or axial distance between the upper and lower sets of gauge points, a pair of eccentric stops 20 and 21 are secured respectively to side plates 5 and 6 adjacent the upper and lower heads to determine the proper permanent relation between the heads and their respective side plates. After these eccentrics are once adjusted, they are then firmly clamped in position by small bolts such as 22 and the permanent screws 7 are tightened. It will be understood that the lower end of plate 5 has vertical elongated slots 23 and 24 through which the lower gauge point 15 and clamping screw 8 respectively extend as shown in Figs. 5 and 6. Similarly the upper end of side plate 6 has a vertically elongated slot 25 through which gauge point 14 extends. Clamping screw 9 extends through a slot similar to slot 24.

Figure 3:
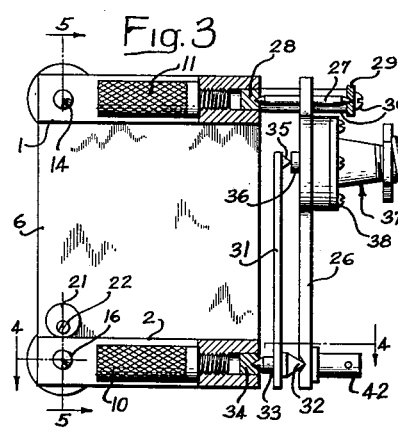
Fig. 3 is a transverse section taken substantially on the line 3—3 of Fig. 2 but showing the micrometer screw in elevation.

The strain responsive electrical contacts and micrometer follow-up screw include a main supporting arm 26 dependently supported by a horizontal pin 27 which is pivotally connected to a plug 28 in head 1, Fig. 3, and to a plate 29 which is secured to head 1 in spaced relation thereto by screws and spacing sleeves generally indicated at 30, Figs. 1 and 3. Interposed between the lower end of arm 26 and lower head 2 is a strain responsive bellcrank lever 31 having on its opposite sides a double pivotal connection including a transverse knife edge 32 seated against arm 26 and a pivot stud 33 seated in a plug 34 of head 2. The pivots 27 and 33 could be seated directly in the bodies of the head although the insertion of the plugs 28 and 34 in the centering pin recesses provides a convenient arrangement. The upper end of strain responsive lever 31 has an electrical contact 35 engageable with a contact 36 which is the micrometer screw of a micrometer generally indicated at 37. This micrometer is supported in insulated relation upon arm 26 by screws 38, while the screw is operated from a remote source of power preferably through a suitable mechanical ball and pin connection 39. The details of construction of the micrometer per se do not constitute a part of my present invention and hence further description thereof is not deemed necessary. A generally similar type of micrometer is shown in my Patent 2,085,687 which if desired could be specifically employed herein. The knife edge 32 and pivot stud 33 are held in their operative relation to arm 26 and head 2 by a pair of springs 40, Fig. 4, connected to head 2 and to a cross bar 41 extending, Figs. 3 and 4, through a rearwardly extending boss 42 of arm 26. Electrical wires may be suitably connected to contacts 35 and 36 in the same manner as shown in my patent just mentioned.

*Operation.*—Preparatory to placing the extensometer on specimen 4, the clamping screws 8 and 9 are first loosened and then clamping heads 1 and 2 are lightly pressed toward each other with one's fingers whereupon the clamping screws are tightened to hold side plates 5 and 6 in fixed relation to the heads. The slots such as 23 and 24 in the side plates, Figs. 5 and 6, and similar slots in the side plate 6 are of just the right axial distance apart to give the precise gauge length when the heads are lightly pressed toward each other. With the heads and side plates now secured together, the extensometer is placed on the specimen with the centering pins 10 and 11 engaging the same, whereupon gauge points 13—16 are then brought into engagement with the specimen and locked in position by nuts 18. The clamping screws 8 and 9 are then loosened so that the extensometer heads are then free to separate longitudinally without restraint upon occurrence of strain in the specimen. The clamping screws slide in their plate slots during any extension of the extensometer, it being understood that such slots and screws have a close but freely slidable fit. As the heads 1 and 2 move away from each other upon elongation of the specimen, bellcrank lever 31, Fig. 3, is moved in a counterclockwise direction about knife edge 32. The circuit which is normally employed with the contacts 35 and 36 is thereupon broken whereby a recorder instrument not constituting a part of my invention causes rotation of connection 39 and screw contact 36 to reestablish engagement between the contacts 35 and 36. During strain of a specimen, there is apt to be irregularities in the elongation of a specimen at its surface. The opposed gauge points 13-16 normally average such irregularities provided that the extensometer frame structure can adjust itself. This is accomplished by the slight springiness of the side plates 5 and 6 which allow motion to a sufficient extent in a plane passing through the axes of the gauge screws. The side bars, however, are rigid in a direction at right angles to that plane, thereby causing the clamping heads to be maintained parallel to each other. The foregoing is attained together with providing a substantial structure for supporting and maintaining the electrical leverage system in full operative relation to the heads 1 and 2 when the heads are in their relatively free relation which occurs on loosening of the clamping screws 8 and 9. Upon loosening of these screws, the side plates while permitting unrestricted axial movement between the heads nevertheless structurally function to maintain the heads in parallelism by reason of the plate slots having a very close but free sliding fit with the shanks of the clamping screws.

From the foregoing it is seen that the structure of my improved extensometer is relatively simple, compact and economical in initial cost, consistent with obtaining precision qualities in sensitivity and accuracy but without sacrificing durability or ease of handling.

It will of course be understood that various changes in details of construction and arrangement of parts may be made by those skilled in the art without departing from the spirit of the invention as set forth in the appended claims.

I claim:

1. An extensometer comprising, in combination, upper and lower heads, flat side plates connecting said heads at transversely spaced points thereof, and means for releasably securing said plates to said heads, said means having provision whereby upon release of the plates said heads are maintained in substantial parallelism with each other.

2. An extensometer comprising, in combination, upper and lower heads having opposed gauge points, flat side plates connecting said heads at transversely spaced points, means for releasably securing said plates to said heads so that in operation said heads are axially supported only by said gauge points, said means having provision whereby upon release of the plates said heads are maintained in substantial parallelism with each other, and an electrical contact strain responsive leverage system connected to said heads so as to be operated thereby when the side plates are released.

3. An extensometer comprising, in combination, upper and lower heads, gauge points carried by said heads for clamping the same to a specimen, a side plate permanently secured to the upper head and releasably secured to the lower head, another side plate permanently secured to the lower head and releasably secured to the upper head, and means whereby upon releasing of said plates from their respective heads the plates are operative to maintain the heads parallel with each other.

4. An extensometer comprising, in combination, upper and lower heads, gauge points carried by said heads for clamping the same to a specimen, a side plate permanently secured to the upper head and releasably secured to the lower head, another side plate permanently secured to the lower head and releasably secured to the upper head, means whereby upon releasing of said plates from their respective heads the plates are operative to maintain the heads parallel with each other, and an electrical contact strain responsive leverage system supported by said heads so as to be operated thereby when said plates are released from their respective heads.

5. An extensometer comprising, in combination, upper and lower heads, side plates respectively secured to certain of said heads and releasably secured to the other of said heads, means for maintaining said heads in substantial parallelism when released from said plates, opposed gauge points carried by said heads for clamping the same to a specimen, centering pins removably supported by said heads, a strain responsive leverage system having upper and lower pivots, and means for supporting said pivots in alignment with the axes of said centering pins.

6. An extensometer comprising, in combination, upper and lower heads, side plates respectively secured to certain of said heads and releasably secured to the other of said heads, opposed gauge points carried by said heads for clamping the same to a specimen, centering pins removably supported by said heads, a strain responsive leverage system having upper and lower pivots, and means for supporting said pivots in alignment with the axes of said centering pins, said heads having horizontal recesses one end of which receives said centering pins while their other ends receive plugs for supporting said pivot pins.

7. An extensometer comprising, in combination, upper and lower heads, relatively thin side plates whose opposite ends are permanently secured to certain of said heads and releasably secured to the other of said heads, clamping screws extending through said plates and connected to said heads for effecting said releasable connection, and gauge points extending through said plates and heads for clamping the same to a specimen, said plates having vertical slots through which said clamping screws and certain of said gauge points extend.

8. The combination set forth in claim 7 further characterized in that certain of said slots have end portions adapted for predetermined engagement with said clamping screws so as to define the gauge length of the extensometer when the heads thereof are fully pressed toward each other.

9. An extensometer comprising, in combination, upper and lower heads, side plates permanently secured to certain of said heads and releasably secured to the other of said heads, and adjustable means for determining the initial axial relation between said plates and their heads.

10. An extensometer comprising, in combination, upper and lower heads, side plates permanently secured to certain of said heads and releasably secured to the other of said heads, and eccentrics carried by said plates for engagement with said heads for determining the initial axial relation between said plates and heads.

11. An extensometer comprising, in combination, upper and lower heads, gauge points carried by said heads for clamping the same to a specimen, a side plate permanently secured to the upper head and having slidable guiding attachment to the lower head, another side plate permanently secured to the lower head and having slidable guiding attachment to the upper head, said slidable attachments being operative to maintain the heads in substantial parallelism with each other, and an electrical contact strain responsive leverage system supported by said heads so as to be operated thereby during said slidable guiding action between the plates and heads.

12. An extensometer comprising, in combination, upper and lower heads, flat side plates, and means connecting said plates and heads at transversely spaced points thereof including means for effecting a slidable guiding attachment of said plates to certain of said heads, said slidable attachment having provision whereby said heads are maintained in substantial parallelism with each other during axial movement therebetween.

13. An extensometer comprising, in combination, upper and lower heads, opposed gauge points carried by said heads, relatively thin and flexible flat side plates, and means connecting said plates and heads at transversely spaced points thereof including a slidable guiding attachment of said plates to certain of said heads, whereby said plates may flex slightly in the direction of a plane containing the axes of said gauge points while firmly resisting tilting of said heads about the axes of said gauge points.

ORVILLE S. PETERS.